United States Patent [19]

Lauchenauer

[11] Patent Number: 4,649,077

[45] Date of Patent: Mar. 10, 1987

[54] HEAT ACTIVATABLE MULTI-COMPONENT SHEET MATERIAL & PROCESS FOR MAKING SAME

[75] Inventor: Alfred E. Lauchenauer, Horn, Switzerland

[73] Assignee: Adnovum AG, Switzerland

[21] Appl. No.: 736,416

[22] Filed: May 20, 1985

Related U.S. Application Data

[63] Continuation of Ser. No. 482,209, Apr. 5, 1983, abandoned.

[30] Foreign Application Priority Data

Apr. 7, 1982 [GB] United Kingdom ............. 8210284
May 18, 1982 [GB] United Kingdom ............. 8214438

[51] Int. Cl.$^4$ .................... B32B 5/16; B32B 5/18; B32B 7/12; C09J 7/02
[52] U.S. Cl. ................ 428/317.1; 156/283; 264/126; 428/317.3; 428/327; 428/349; 428/357; 428/402; 428/407
[58] Field of Search ............ 264/126; 428/315.5, 428/315.7, 315.9, 317.1, 317.3, 317.5, 327, 349, 357, 402, 407; 156/283; 521/919

[56] References Cited

U.S. PATENT DOCUMENTS

| | | | |
|---|---|---|---|
| 3,067,469 | 12/1962 | Yarrison | 264/126 |
| 3,267,187 | 8/1966 | Slosberg et al. | 264/126 |
| 3,354,247 | 11/1969 | Zehender et al. | 264/126 |
| 3,922,418 | 11/1975 | Lauchenauer | 428/196 |
| 4,115,499 | 9/1978 | Salyer et al. | 264/126 |
| 4,323,531 | 4/1982 | Bradley et al. | 264/126 |

Primary Examiner—William J. Van Balen
Attorney, Agent, or Firm—Ostrolenk, Faber, Gerb & Soffen

[57] ABSTRACT

This invention relates to a heat activatable adhesive formed from at least two components each in the form of discrete, flowable particles which are capable of adhering in abutment of one particle with another to provide an open structured, porous matrix. The adhesive may be in the form of a sheet formed by blending the particles of each component, applying the mechanical mixture to a supporting sheet, heating the mixture and supporting sheet to the temperature at which the material with the lowest tackifying temperature becomes tacky, applying pressure sufficient to partially flatten the largest particles to a degree such that their minimum dimension is substantially equivalent to the thickness of the layer formed on said support sheet and during or after said pressure application.

20 Claims, No Drawings

HEAT ACTIVATABLE MULTI-COMPONENT SHEET MATERIAL & PROCESS FOR MAKING SAME

This is a file wrapper continuation of application Ser. No. 482,209, filed Apr. 5, 1983, and now abandoned.

DESCRIPTION

This invention relates to multi-component sheet materials, bonding layers therefor and a method of manufacturing such layers and sheet materials.

When joining or laminating two layers of a composite sheet material, or of pre-cut parts or of shaped bodies to form a composite sheet material, liquid adhesives in the form of pastes, solutions or dispersions have been used.

The problems inherent to such liquid bonding systems, in particular the need to remove liquid media by evaporation while holding the objects to be joined tightly together to prevent breaking of the initially weak adhesive bonds, the difficulty of evaporating liquid media through thick or impervious sheet material and, more recently, ecological considerations, have lead to the development of new bonding systems. Among the many bonding systems are fusible adhesive systems which can be used in which a thermoplastic body applied in the form of a powder, a film, a web or net is interposed between the materials to be bonded, heated to a temperature causing the fusible adhesive to become tacky, and caused to bond the materials together by applying at least light pressure to the materials to be bonded together while letting the fusible adhesive cool to a temperature below its tackifying point.

While such fusible adhesives in the form of sheets offer many advantages over adhesives applied in liquid form and also are in several respects superior to fusibles applied in the form of powders (particularly as regards the ease of handling and of controlling accurately the amount of fusible adhesive applied), they have some inherent disadvantages. There are, for instance, serious limitations as regards the thermoplastic polymers which can be used in such a system, e.g. the melt index has to be within a certain range if the thermoplastic polymer has to be blown or extruded into a film, spun into a web or converted by one of several methods available into a net-like structure. Certain polymers are difficult to extrude due to other intrinsic properties.

Films, the cheapest of these products from a production point of view, tend to shrink when heated, they cause severe stiffening due to the all-over bonding, and in most cases they render the laminate impervious to air.

A further problem of all known fusible materials used in such a system is that they consist inevitably of one fusible or at best of homogeneously blended polymers.

If a two-component fusible system is desirable, e.g. fusibles having different tackifying temperatures so that positioning of two materials to be bonded can be effected under very mild conditions, with final bonding taking place later, for instance after cutting, and shaping, or if two different fusibles are desirable because widely different requirements as regards the fastness of the bond to different solvents have to be met (e.g. boiling aqueous washing liquors, and chlorinated hydrocarbons used for dry-cleaning), a homogeneous blend of different fusibles is useless because the component less resistant to a given treatment will determine the behaviour of the blended fusible, i.e. the component less resistant to, e.g. swelling in chlorinated hydrocarbons, will determine the peel strength in this media.

It is also difficult to incorporate agents into sheet-like fusibles produced from molten polymer batches which are capable of interacting with the fusible material present either chemically or otherwise, since such interaction can take place prematurely during the melting of the system, i.e. even before the sheet material is formed.

According to the present invention, there is provided a heat activatable multicomponent adhesive characterised by at least two components each in the form of discrete particles, the particles being capable of abuttal with adjacent particles to form an adhesive matrix having an open porous structure.

The invention also includes a process for producing a heat activatable sheet material in accordance with the invention characterised by (i) blending the components of the bonding layers in the form of free flowing particles;
(ii) applying the mechanical mixture of particles to a supporting sheet material having an adhesion to any of the particles which is lower than the cohesion between the particles;
(ii) heating the particles and said support sheet to a temperature at which the material with the lower tackifying temperature becomes tacky;
(iv) and thereafter cooling to below the tackifying temperature of all the material present.

Prior to or during cooling, sufficient pressure may be applied to the heated mixture to flatten the largest particles to a degree such that their minimum dimension is substantially equivalent to the thickness of the layer formed on said supporting sheet.

The invention includes a bonding layer for use in the formation of multi-component sheet materials which layer comprises (1) at least two components
(2) each of said components being present in the sheet material in the form of contiguous discrete particles, cohering only at points of contact between the particles and adjacent particles of the adjacent sheet material to form an essentially coherent conglomeratic sheet material
(3) said discrete, peripherically bonded particles being arranged in the sheet in conglomeratic random distribution wherein at least the largest discrete particles are preferably present in a flattened form, their smaller dimension being substantially equal to the maximum thickness of the sheet and wherein the degree of abbutal of adjacent particles is such that the bonding layer so formed remains porous.

If desired, the fusible conglomeratic sheet material formed may be batched or stacked together with the sheet material on which it was formed, or separated therefrom before batching or stacking. In many cases it is desirable from a handling point of view to use a release paper as substrate to which particulate fusibles are applied, and to peel it off only immediately before or even during actual use of the fusible sheet material as a laminating agent. In this case, the conglomeratic sheet material thus is shipped to points of application with the release paper still in place.

Alternatively, a scaffolding sheet material may be adhered to the conglomeratic material, either during the formulation of the latter (underneath when the particulate thermoplastic material is deposited, on top after the formation of the conglomeratic sheet, e.g. while it is still tacky after sintering), or subsequently, to impart mechanical strength to the conglomeratic sheet material. "Contiguous discrete particles" means particles (small pellets, ground pellets or particles produced by grinding or crushing larger chunks or layers of thermoplastic polymers), which are applied to the substrate (release sheet material) in such a number per unit area that they are spaced sufficiently closely to stick together at their fringes, i.e. the points of contact when heated to the plastifying or tackifying temperature of at least the component having the lower tackifying temperature.

If pressure is applied to the layer of tackified particles, i.e. if they are flattened subsequently, the original spacing may be more open, the flattening providing contact between particles even if there was none before the flattening. At the stage where the temperature drops below the tackifying temperature, there should be sufficient cohesion between particles in the conglomeratic sheet that the sheet material has at least some degree of integrity, i.e. does not entirely decompose into particles when it is separated from the supporting sheet material. The particles present in the conglomeratic sheet material should cohere only where they abut to each other, i.e. at points of contact between individual particles, that is at peripheral points, not over a substantial surface area of particles ("peripheral bonding between particles").

"Thermoplastically activatable" as used throughout this specification means that a material can be rendered active by applying heat to reach the activation temperature of at least one of the components present in the conglomeratic sheet material; "active" meaning a state where this material becomes tacky and/or undergoes an irreversible change such as a change in its mechanical properties, in particular an increase of intermolecular cohesion (e.g. caused by the formulation of crosslinks between macromolecular chains) and/or an increase of the melting point, the melt flow viscosity and the resistance to swelling.

As outlined below, the system thus may be what is called a reactive system, where at the activation temperature level interaction between different components present in the conglomeratic sheet material is initiated.

The term "conglomeratic sheet" or "conglomeratic sheet material" as used throughout this specification denotes a sheet material consisting of at least two different components which are present in the form of discrete particles cohering at their peripheries and are arranged in random distribution, with an appearance like a mosaic but without a regular or repetitive pattern. The discrete particles (peripherally cohering) preferably are flattened in the course of the formulation of the sheet material under the action of heat, on one hand to achieve in a simple and reliable fashion peripheral coherence, and on the other to equalise and adjust to a predetermined level the thickness of the sheet (the particles used to form it will not necessarily have a uniform particle diameter). Generally speaking it is advantageous to use particles at least for one of the components present which have an average diameter not more than 50%, preferably not more than 25% larger than the desired thickness of the conglomeratic sheet, not is preferably the average diameter of any major component ("major" meaning more than 25% of the total weight) smaller than 25% of the desired thickness of the conglomeratic sheet.

In most cases it is advantageous to use particle sizes for all components where the smaller dimension (the smallest diameter) is at least equal to but not exceeding 125% the desired thickness of the sheet formed. In certain cases, however, it is preferable to form a conglomeratic sheet from particles substantially or even several times smaller than the final thickness of the conglomeratic sheet, which then still will have a conglomeratic structure, but with several layers of different particles arranged over the cross-section of the sheet at least in the case of one of the components forming the sheet.

In actual use of conglomeratic sheet material, i.e. when it is used to laminate sheet material to other sheet material or precut parts (or shaped articles) to sheet material under the influence of heat and pressure, the conglomeratic configuration will disappear at least partly at interfaces only if the components are soluble in each other and if melt flow viscosities are so high that at interfaces actual mixing takes place. Generally speaking this will not happen to any appreciable degree if both components are fusible, i.e. thermoplastic adhesives, the melt flow viscosity and the solubility being too low. This overcomes a problem inherent to films, printed dots etc. consisting of two different fusibles, where the two materials after fusing are mixed in the sense that the two components overlap in varying ways and degrees. This means that in actual use, e.g. during care treatments such as drycleaning or washing, the less resistant, i.e. more swellable component will determine the resistance of the bond. This is, of course, not the case if the two thermoplastic components are present as essentially separate particles in the conglomeratic structure.

If on the other hand, mixing of components present in the conglomeratic is desirable, for instance in the case of a reactive system, the melt flow properties of thermoplastic polymers present and/or solubilities and/or particle size ratios can be adjusted in such a way that blending or diffusion of one component into the other will readily take place, greatly assisted by the mechanical action which in actual use is effected to achieve bonding between two surfaces.

Components useful as components in the conglomeratic sheet are for instance:

Thermoplastic polymers: polymeric hydrocarbons (e.g.polyethylene, polypropylene), acrylates, polyesters, polyamides (in particular terpolymers), vinyl compounds (e.g. polyvinylacetates), copolymerisates of olefinic, acrylic and vinylic monomers, block polymers, mixtures of polymers, polyurethanes (including elastomeric polyurethanes), polylactones, polylactames.

Any polymer capable of being tackified if heated to a temperature preferably in the range of 50° C. to 200° C., (the tackifying being caused by a lowering of intermolecular cohesion within the macromolecular structure) may be used. The polymers or the mixture of polymers may contain agents lowering the tackifying temperature, increasing tackiness, lowering intermolecular cohesion, fillers, pigments or other coloured matter, agents lowering or increasing the viscosity of the molten polymers, but also agents capable of interacting with one or several of the polymeric materials present not only in a physico-chemical way (e.g. by increasing tackiness, lowering tackifying or glass temperatures and/or the melting point etc.), but by increasing intermolecular cohesion if heated to the activating temperature in intimate contact (i.e. thoroughly mixed) with the polymer.

Such interaction may be useful for adjusting tackiness, tackifying or softening temperatures, to change such properties during or after actual fusing takes place, in particular to permanently increase intermolecular cohesion with the purpose of increasing the resistance to swelling or dissolving in liquid media and to refusing and retackification.

To prevent premature interaction between such agents and the polymers they are capable of interacting with, several methods are available.

One may apply the polymeric material and the interacting agent in the form of discrete particles, mixing taking place only when the conglomeratic material in a thermally plastified state is exposed to mechanical pressure between two surfaces. One may also integrate one of the interacting components in encapsulated form, i.e. in a form where each particle is surrounded by a skin preventing mixing or even contact with the other component.

Still another method consists in incorporating an auxiliary agent capable of strongly swelling or even dissolving at least one of the interacting components, this auxiliary agent being released or activated only when proper heat and/or pressure are applied to the conglomeratic material.

Such agents (like the components themselves) thus may be incorporated in encapsulated form, have a melting point sufficiently high or be applied or present in another form or configuration suitable for preventing premature interaction. Still another method for preventing premature interaction is the incorporation of reactive agents in the form of derivatives, which release the reactive component only at a certain temperature (decomposition or release temperature). This method is particularly suitable for conglomeratic sheet material where the properties of thermoplastic polymers are to be changed after fusing by chemical reaction, i.e. by the formation of covalent bonds increasing intermolecular cohesion. Still another method for preventing premature interaction is to incorporate components into the conglomeratic which do not interact at the temperature applied to effect formation of the conglomeratic sheet, but will undergo desirable interactions (such as an increase of intermolecular cohesion) if exposed to other sources of energy such as for instance radiation, if desirable or necessary in presence of agents causing, accelerating or catalysing such interaction, e.g. organic peroxides in the case of polymers or prepolymers undergoing crosslinking or chain lengthening under the action of radiation, such as, for instance beta rays. If desired, filling material such as inorganic or organic fillers, fibrous material, pigments or other coloured matter, hydrophobing or flame proofing agents etc. may be incorporated into the conglomeratic sheet material or applied to it subsequently. Such agents as fillers, pigments or other agents not taking part in fusing and/or chemical actions between components of the conglomeratic sheet material or between this sheet material and other material to which it is to be fastened, may be fully intergrated, i.e. thoroughly mixed with one or more of the fusible components present, agents interacting with at least one of the other components present, or the different components themselves may be present in conglomeratic form, i.e. touching or mixing only at abuttal points. Cohesion by contact at abuttal points is such that the mechanical integrity of the conglomeratic sheet material after it has been produced and when it is separated from the supporting sheet material on which it was produced is at least at a level where a strip five centimeters wide cut from the conglomeratic sheet material in the machine direction has at room temperature an average tensile strength expressed in grams of at least 10, preferably at least 30 to 60 times the average weight expressed in grams of the conglomeratic sheet material.

Embodiments of the present invention will now be described, by way of illustration only, with reference to the following examples:

EXAMPLE 1

Preparation of Conglomeratic Sheet Material

A two-component conglomeratic sheet material, capable of being thermally activated, was produced by scatering a mixture of 60% by weight of a high density polyethylene (melting point 131° C. melt index 5, density 0.95) and 40% of a polyamide terpolymer (nylon 6, nylon 6.6 and nylon 12, melting point 110° C.), onto a release paper. The weight of the powder mixture was 85 grams per square meter and the particle size was 50 to 200 microns. Sintering of the powder layer was effected by heating with infra red to a temperature which rendered the components of the powder mixture tacky. While the resulting sheet material was still thermally plastified, the release paper carrying the material was led through the nip of a calender. The temperature of the metal roller flatting the thermoplastic sheet material has a temperature of about 75° C. The calendering resulted in flattening protruding particles, in making the fringes of the flattened particles stick together and in imparting uniform width to the conglomeratic sheet material, which was batched together with the release paper. The weight of the conglomeratic sheet material was 85 g/square meter, the tensile strength (strip 5 centimeters wide, 10 centimeters long) was 3600 gr

EXAMPLE 2

The same procedure was used to prepare a conglomeratic sheet material from 75% of low density polyethylene (melting point 125° C. melt index 6) and 35% of a low melting polyester (melting point 85 C). The particle size of the polyethylene was 50 to 100 micron, and of the polyester 150 to 300 micron. The weight of the layer of powder deposited on the release paper was 50 grams/square meter.

In actual use (for laminating precut parts of shirts to interlinings), brief pressing at a temperature of about 130° C. was sufficient to pre-fix the 2 layers for easy handling (only the low melting component being activated), while final fixation was effected as usual at 150° to 170° C. The same material also proved useful for prefixing labels and trimmings to garments.

EXAMPLE 3

The same procedure was applied to produce a conglomeratic sheet material from the polyethylene mentioned in Example 1 (particle size 20 to 100 micron) and finely powdered peroxide and the polyester mentioned in Example 2.

EXAMPLE 4

A mixture of 50 parts of polyethylene (melt index 40) and 100 parts of encapsulated activated carbon (cellulose acetate partly hydrolyzed forming cell wall) was applied by scattering particles onto a release paper. The particle size of the polyethylene was 150 to 250 micron, and of the encapsulated carbon 100 to 150 micron. After sintering and calendering to a thickness of 150 micron, the conglomeratic sheet was released from the paper and batched. It was used to coat a woven fabric with an absorbent layer of activated carbon held together by the polyethylene, this layer being bonded to the fabric by re-heating to the tackifying temperature, joining it with the fabric under light pressure and cooling.

The same laminate structure can be obtained in one step by superimposing the fabric to the sintered polyethylene, applying sufficient pressure to reduce the average thickness of the conglomeratic sheet to about 120 micron, cooling and separating from the release paper, or by using the fabric itself as the supporting sheet material during scattering, then sintering and calendering as described before.

EXAMPLE 5

The same process was repeated, substituting an encapsulated bacteriostatic agent for activated carbon.

EXAMPLE 6

The same process was repeated as in Example 4, substituting an epoxy prepolymer for the polyethylene and a catalyst capable of curing the prepolymer for the encapsulated. activated carbon, the capsules in this case having a diameter of about 50 microns. When the conglomeratic sheet material subsequently was used for laminating two thick sheet materials (heavy fabrics), the conglomeratic sheet material was superimposed on one of the two fabrics, heated beyond the tackifying temperature by infra red radiation, and squeezed between the two fabrics (the second one being superimposed on the tackified conglomeratic sheet after tackification) to a thickness of 30 micron, the capsules being crushed thereby and thus releasing the catalyst and causing the formation of an insoluble polymer upon further heating.

A similar effect was obtained when the catalyst was not applied in an encapsulated form, but as particles of about the same size.

I claim:

1. A method of producing a sheet of multi-component heat activatable adhesive consisting essentially of
   (i) blending the components of the bonding layer in the form of free flowing particles; said components comprising at least two thermo-plastics each in the form of discrete particles capable of abuttal with adjacent particles to form an adhesive matrix having an open porous structure, one of said components having a tackifying temperature which is lower than the other blend components;
   (ii) applying the blend of particles to a supporting sheet material having an adhesion to any of the particles which is lower than the cohesion between the particles;
   (iii) heating the particles and said support sheet to a temperature at which said component with the lower tackifying temperature becomes tacky but insufficient to cause the blend to form a non-open, non-porous structure and causing or allowing said components to form an open porous structure;
   (iv) and thereafter cooling to below said lower tackifying temperature; thereby to provide on removal of the support sheet a sheet of still substantially discrete component materials.

2. A method as claimed in claim 1 wherein the components are selected from the group consisting of polymeric acrylates, polyesters, polyamides, vinyl polymers and copolymers, copolymers of olefinic hydrocarbons and acrylic monomers, polyurethanes, polylactones and polylactames.

3. A method as claimed in claim 1 characterised in that each component is selected from polymers capable of being tackified if heated to a temperature in the range of 50° C. to 200° C.

4. A method as claimed in claim 1 characterised in that the particles of at least one component are encapsulated with a surface layer to prevent mixing or contact with an adjacent particle.

5. A method as claimed in claim 1 characterised in that prior to or during cooling, sufficient pressure is applied to the heated blend to flatten the largest particles therein to a degree such that their minimum dimension is substantially equivalent to the thickness of the layer formed on said supporting sheet.

6. A method as claimed in claim 5 characterised in that the application of the heat and pressure is adjusted to a level such that the resultant matrix exhibits a degree of mechanical integrity such that when separated from the supporting sheet material, a strip 5 cm wide has an average tensile strength expressed in grams of at least 10 times the weight expressed of the matrix layer per square meter at room temperature.

7. A method as claimed in claim 5 characterized in that each component is selected from polymers capable of being tackified if heated to a temperature in the range of 50° to 200° C.

8. A method as claimed in claim 7 characterised in that the components are selected from the group consisting of polymeric acrylates, polyesters, polyamides, vinyl polymers and copolymers, copolymers of olefinic hydro-carbons and acrylic monomers, polyurethanes, polylactones and polylactames.

9. A method as claimed in claim 1 characterized in that one component is polyethylene.

10. In a method of laminating two layers of a sheet material which comprises interposing between the two layers of sheet material, a thermoplastic adhesive to form a pre-laminate, heating the so formed pre-laminate to a tackifying temperature, and applying heat and pressure thereto to form a fused laminate on cooling, the improvement which comprises pre-forming the thermoplastic adhesive into a porous sheet material comprising at least two thermoplastics having different tackifying temperature in the form of discrete particles, said particles being in abuttal with adjacent particles to form an adhesive matrix having an open porous structure.

11. A method according to claim 10 characterized in that the heat and pressure applied to the prelaminate is insufficient to eliminate all of the open porous structure of the adhesive matrix.

12. A method as claimed in claim 11 in which the thermoplastic adhesive is pre-formed on a removable release sheet.

13. A method as claimed in claim 10 characterized in that the thermoplastics are selected from the group consisting of polymeric acrylates, polyesters, polyamides, vinyl polymers and copolymers, copolymers of olefinic hydrocarbons and acrylic monomers, polyurethanes, polylactones and polylactames.

14. A method as claimed in claim 10 characterized in that each thermoplastic is a polymer tackifiable at a temperature in the range of 50° to 200° C.

15. A method as claimed in claim 10 characterized in that the particles of at least one of the thermoplastics are encapsulated within a surface layer to prevent premature mixing or contact with adjacent particles.

16. A method as claimed in claim 10 characterized in that one component is polyethylene.

17. A method of producing a sheet of multi-component heat activatable adhesive characterized by
   (i) blending the components of the bonding layer in the form of free flowing particles, said components comprising at least two thermoplastics each in the form of discrete particles capable of abuttal with adjacent particles to form an adhesive matrix having an open porous structure, one of said components having a tackifying temperature which is lower than the other blend components, one of said components being polyethylene and one of said components being selected from the group consisting of a terpolymer of nylon 6, nylon 66 and nylon 12, a polyester and cellulose acetate encapsulated activated carbon;
   (ii) applying the blend of particles to a supporting sheet having an adhesion to any of the particles which is lower than the cohesion between the particles;
   (iii) heating the particles and said support sheet to a temperature at which said component with a lower tackifying temperature becomes tacky but insufficient to cause the blend to form a non-open, non-porous structure; and
   (iv) thereafter cooling to below said lower tackifying temperature.

18. In a method of laminating two layers of sheet material which comprises interposing between the two layers of sheet material, a thermoplastic adhesive to form a pre-laminate, heating the so formed pre-laminate to a tackifying temperature, and applying heat and pressure thereto to form a fused laminate on cooling, the improvement which comprises employing as the thermoplastic adhesive, the sheet produced by the method of claim 1 which has been separated from said supporting sheet material.

19. In a method of laminating two layers of sheet material which comprises interposing between the two layers of sheet material, a thermoplastic adhesive to form a pre-laminate, heating the so formed pre-laminate to a tackifying temperature, and applying heat and pressure thereto to form a fused laminate on cooling, the improvement which comprises employing as the thermoplastic adhesive, the sheet produced by the method of claim 17 which has been separated from said supporting sheet material.

20. In a method of laminating two layers of a sheet material which comprises interposing between the two layers of sheet material, a thermoplastic adhesive to form a pre-laminate, heating the so formed pre-laminate to a tackifying temperature, and applying heat and pressure thereto to form a fused laminate on cooling, the improvement which comprises pre-forming the thermoplastic adhesive into a porous sheet material comprising at least two thermoplastics having different tackifying temperatures in the form of discrete particles, said particles being in abuttal with adjacent particles to form an adhesive matrix having an open porous structure, wherein one of said thermoplastic components is polyethylene and one of said thermoplastic components is selected from the group consisting of a terpolymer of nylon 6, nylon 66 and nylon 12, a polyester and cellulose acetate encapsulated activated carbon.

* * * * *